Inventor:
William E. Glenn Jr.,
by John J. Kissane
His Attorney.

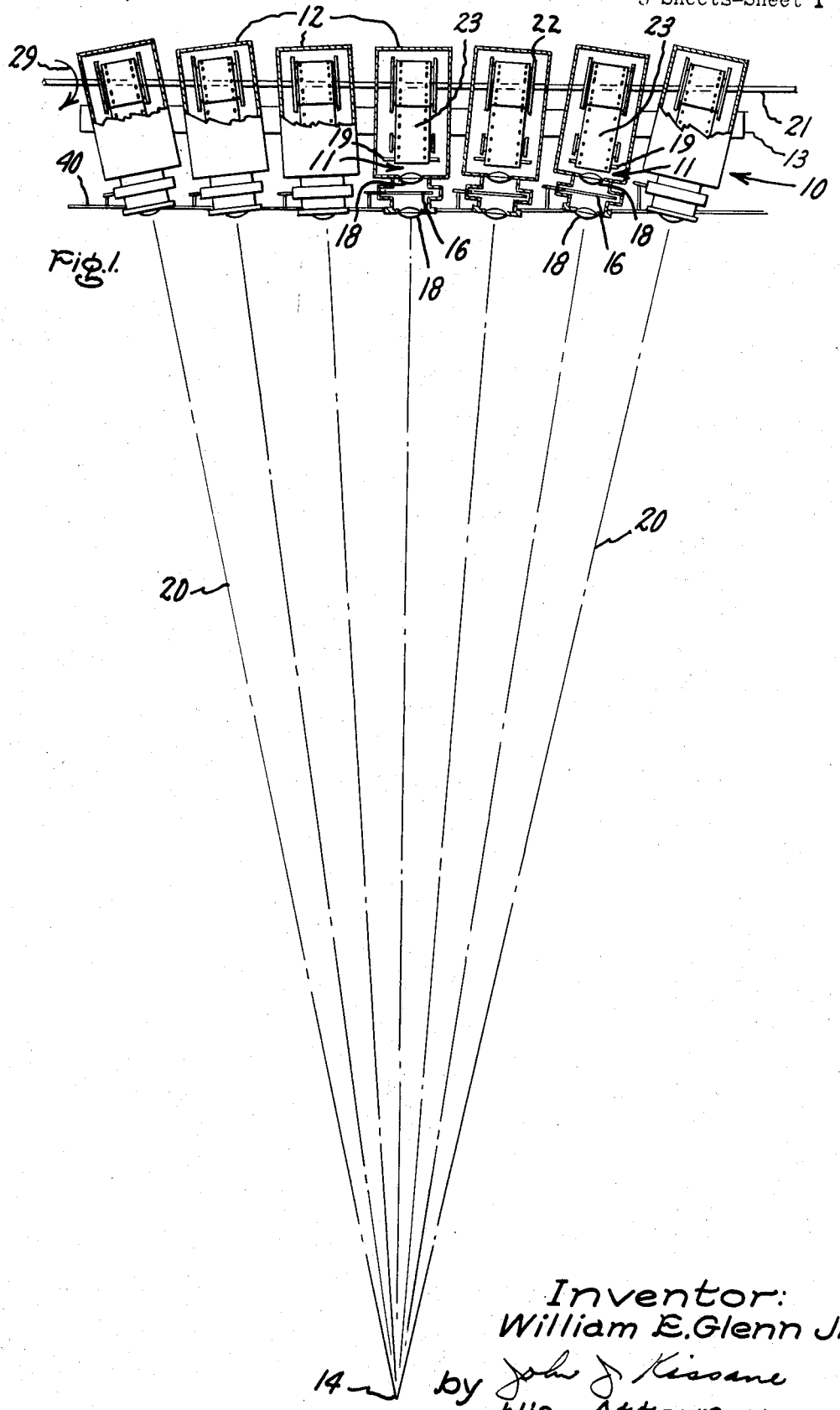

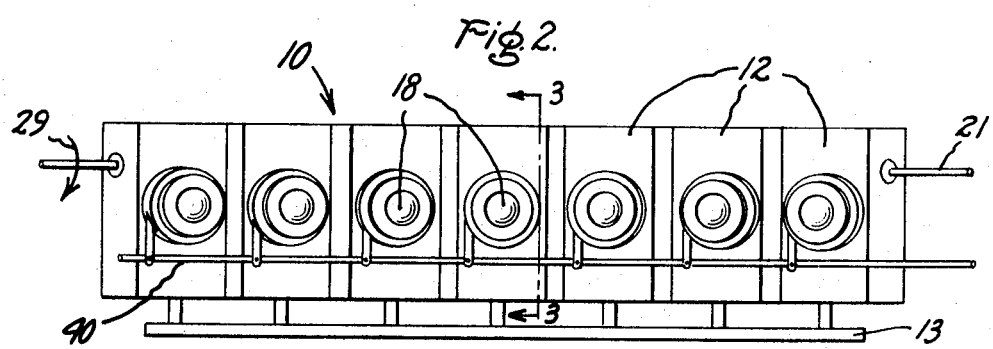
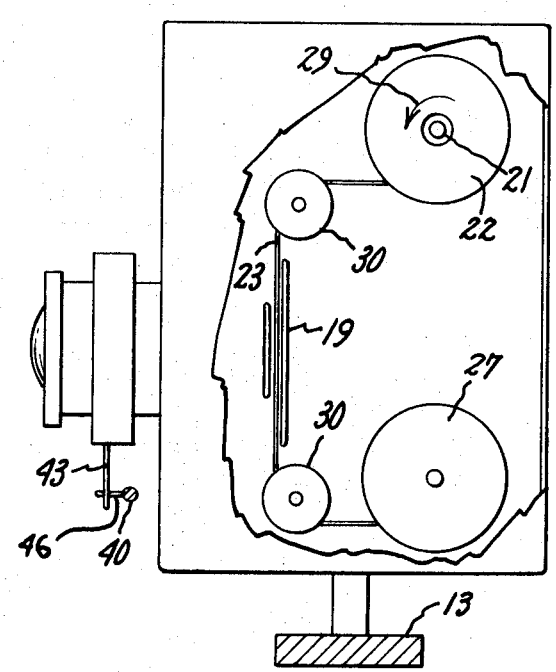

United States Patent Office 3,518,929
Patented July 7, 1970

3,518,929
THREE DIMENSIONAL CAMERA
William E. Glenn, Jr., Scotia, N.Y., assignor to General
Electric Company, a corporation of New York
Filed Mar. 6, 1967, Ser. No. 620,844
Int. Cl. G03b 35/08
U.S. Cl. 95—18                                                7 Claims

ABSTRACT OF THE DISCLOSURE

A parallax stereogram camera composed of a plurality of camera units having optical axes convergent upon the scene to be photographed is provided with a common film transport mechanism in the form of a single straight shaft extending through the film spools of all the camera units. The film spools are situated along the length of the straight shaft and are pivotal relative to the axis of the shaft thereby permitting the axes of the spools to assume a perpendicular attitude relative to the optical axis of the camera unit with which the spool is associated. A single shutter drive mechanism is employed for all camera units.

---

Figure 4:
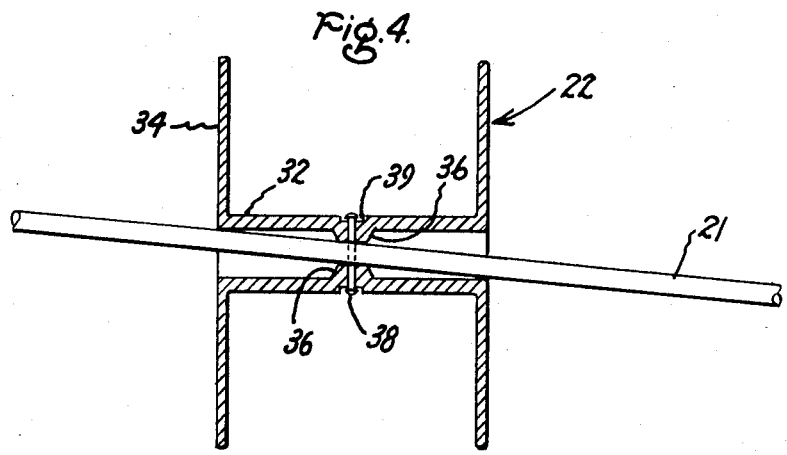

This invention relates to a parallax stereogram camera and in particular to a parallax stereogram camera having a single shutter drive and a single film transport mechanism.

In the formation of three dimensional pictures by the interdigitation of picture elements, the scene forming the three dimensional picture preferably is simultaneously photographed from a plurality of diverse vantage points by a parallax stereogram, or 3D camera. One such 3D camera presently utilized generally consists of a plurality of arcually disposed individual camera units having optical axes convergent upon the scene to be photographed. The arcual attitude of the individual camera units forming the 3D camera generally has prevented the utilization of a common film transport mechanism for the film spools of the individual camera units and it has heretofore been deemed necessary to employ an individual film transport mechanism at a perpendicular attitude to the optical axis of each camera unit in order to prevent film breakage. The utilization of a separate film transport mechanism for each camera unit, however, increases either the time interval between successive exposures of a given scene or the complexity of the motive devices for the film transport mechanisms.

A second factor adding to the structural complexity of prior art 3D cameras is the employment of an individual shutter drive to actuate the shutter mechanism of each camera unit forming the 3D camera. Furthermore, notwithstanding the fact that a single shutter control mechanism often is utilized to initiate the operation of the shutter drives of each camera unit, there can be differences in exposure time of the individual camera units produced by variations in the operational speeds of the individual shutter drives. Picture elements produced by 3D cameras having a plurality of shutter drives therefore often are not identical and the 3D picture formed by an interdigitation of the picture elements is of interior quality.

It is therefore an object of this invention to provide a high speed 3D camera of relatively simple construction.

It is also an object of this invention to provide a 3D camera having self-aligning film spools.

It is a further object of this invention to provide a 3D camera capable of producing a plurality of picture elements of highly uniform quality.

These and other objects of this invention are accomplished in a camera system for simultaneously photographing a given scene from diverse vantage points with a plurality of camera units having optical axes convergent upon the scene to be photographed by the utilization of film spools having means approximately centrally situated along the interior of the hub of the spool for pivotally mounting the spool upon an axial shaft. Thus a single straight shaft operably associated with the plurality of camera units forming the 3D camera can function as a single film transport means to simultaneously advance the individual film spools of each camera unit. The film spools pivot relative to the axis of the straight shaft upon tensioning of the film and the axes of the spools assume a generally perpendicular attitude with the optical axis of the camera unit with which the spool is associated.

A single shutter drive is pivotally connected along its length through linkages to the normally closed shutters of the camera units thereby assuring simultaneous operation of all the shutters of the camera units upon actuation of the single shutter drive. The exposure time of all units therefore is identical and a 3D picture formed by the interdigitation of the pictures of the camera units is of high quality. Thus, the single shutter drive assures uniform quality of the picture elements obtained during a single exposure while the common film transport mechanism allows a minimum time lapse between exposures of successive frames of the film reels. Furthermore, the number of operational elements of the 3D camera of this invention is greatly reduced relative to prior 3D cameras by the utilization both of the single shutter drive and of the single film transport mechanism for the plurality of camera units.

Figure 5:
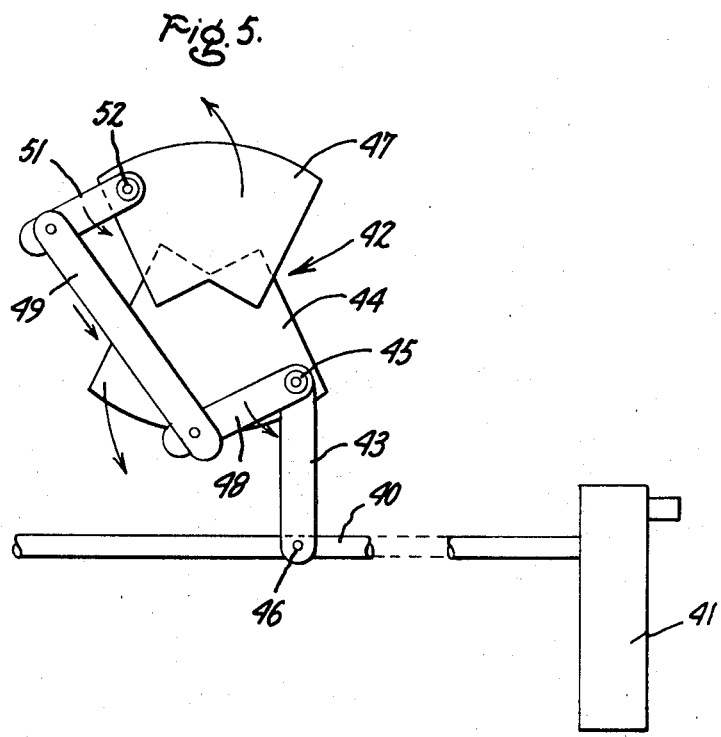

The features of this invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a partially exposed plan view of the 3D camera of this invention disclosing the optical disposition of the interior components forming each camera unit, FIG. 2 is an elevational view of the 3D camera of this invention, FIG. 3 is a sectional view of an individual camera unit taken along lines 3—3 of FIG. 2, FIG. 4 is an enlarged sectional view of a film spool mounted upon the film transport mechanism of the 3D camera, and FIG. 5 is an enlarged view of the shutter blades of a camera unit forming the 3D camera.

The 3D camera 10 of this invention, as depicted in FIGS. 1 and 2, generally includes a plurality of individual camera units 11 enclosed within individual housing 12 suitably mounted upon a common support 13 for the simultaneous photographing of a scene, identified generally by reference number 14. The shutters 16, spaced apart lenses 18 and film guides 19 forming the individual camera units generally are horizontally aligned within a vertical plane orthogonally disposed relative to the axis of the center camera unit of 3D camera 10 and the convergence of the optical axes of the camera units, e.g. the line passing axially through the associated shutters, spaced apart lenses and film guides of each camera unit, is achieved by a tilting of the horizontally aligned components of the camera units to an angular disposition perpendicularly disposed relative to unrefracted light rays 20 from scene 14. Thus the planes of shutters 16, spaced apart lenses 18 and film guide 19 are parallelly disposed relative to each other for each camera unit and depart from a parallel attitude relative to a vertical plane orthogonally disposed relative to the optical axis of the center camera unit of 3D camera 10 proportionally with the lateral departure of the component from the center of 3D camera 10. Although camera units 11 are shown as being enclosed in individual housings 12 for purposes of clarity of illustration, in actual practice a common housing preferably is employed for all the camera units with the component elements forming the camera units being disposed within the single housing at the identical attitude described in FIG. 1.

A single film transport mechanism in the form of a straight shaft 21 extends through each of housings 12 and functions both as a support and a rotator for 35 mm. film takeup spools 22 which spools are axially mounted upon straight shaft 21. The straight shaft is perpendicularly disposed relative to the optical axis of the center camera unit of 3D camera 10 and becomes more acutely disposed relative to the optical axes of the individual camera units 11 with increasing departure of the camera units from the center of 3D camera 10. Thus the convergence of the individual camera units upon scene 14 is accomplished in 3D camera 10 by a tilting of horizontally aligned optical component parts of the camera units forming the 3D camera in contradistinction to prior art 3D cameras wherein the camera units are arcually disposed about the scene to be photographed.

The disposition of a frame of film 23 at a perpendicular attitude to the optical axis of each camera unit generally is accomplished by passing a portion of the film through a conventional film guide 19 as shown in FIG. 3. Film 23 is drawn from supply spool 27 by takeup spool 22 fixedly mounted upon straight shaft 21 upon rotation of shaft 21 by suitable means, depicted generally by rotational arrow 29, while a pair of rollers 30, over which roller film 23 is threaded, assist in feeding the film through film guide 19 at a proper disposition relative to the optical axis of the camera unit.

To prevent tearing of film 23 during transport of an unexposed frame into film guide 19, takeup spool 22 is provided with pivotal means centrally located within the hub of the spool to permit alignment of the takeup spool with the optical axis of the camera unit with which the spool is associated. A pivotal takeup spool preferred for utilization in camera units 11 of 3D camera 10 because of the relative ease of construction of such spool is portrayed in FIG. 4 and generally includes a central hub 32 having radially disposed flanges 34 situated at either end of the hub. The internal diameter of central hub 32 is considerably larger than the outside diameter of straight shaft 21 upon which shaft takeup spool 22 is mounted and a centrally disposed tapered protrusion 36 extends downwardly of the interior of the hub to provide a circumferential bearing surface upon which takeup spool 22 rides. Takeup spool 22 is fastened to straight shaft 21 by a round-headed stud 38 passing axially through oversized apertures within both shaft 21 and protrusion 36 of hub 32. The length of stud 38 is elongated relative to the diameter of annular groove 39 forming an exterior portion of protrusion 36 and functions in conjunction with the large tolerance between the internal diameter of hub 32 and the outside diameter of shaft 21 to permit takeup spool 29 to pivot upon the tapered sides of protrusion 36 about the axis of shaft 21. However in order to avoid damage to film 23 as the film is rolled upon takeup spool 22, the overall length of stud 38 must be smaller than the outside diameter of hub 32. The degree of pivoting of each takeup spool relative to the axis of straight shaft 21 produced by tensile forces within film 23 during winding of the film upon takeup spool 22 generally is determined by the disposition of film roller 30 proximate shaft 21 and preferably is sufficient to align the axis of spool 22 at a perpendicular attitude to the optical axis of the camera unit with which the spool is associated. Thus, when a rotary force, depicted generally by rotational arrow 29, is applied to an end shaft 21 to turn fixedly attached takeup spools 22 thereby simultaneously positioning a new frame within each of film guides 19, the film tension upon each takeup spool generally aligns the spool with the optical axis of the associated camera unit. If desired, means (not shown) can be provided for rewinding film 23 upon supply spools 27 after exposure of all the frames of the film.

In a specific embodiment, a 1/16 inch clearance between the internal diameter of central hub 32 and a 1/4 inch diameter straight shaft 21 has been found sufficient to permit proper swiveling of the takeup spools within the outermost camera units of a 24 inch wide 3D camera having 9 camera units focused upon a scene 26 feet from the 3D camera. The small size of the hub of takeup spool 22 permits the formation of tapered protrusion 36 by an incomplete drilling of central hub 32 of takeup spool 22. By providing a 10 mil clearance both between the diameters of stud 38 and the circular apertures through which the stud passes and between the length of stud 38 relative to the diameter of annular groove 39, takeup spool 22 is free to swivel regardless of the disposition of stud 38 relative to the optical axis.

In order to increase the flexibility of usage of the 3D camera and permit photographs of various scenes at diverse distances, the 3D camera preferably includes adjustment means (not shown) to individually alter the relative dispositions of the optical axes of the individual camera units thereby permitting convergence of the optical axes of the camera units upon scenes situated at distances other than the 26 feet described in the preferred embodiment. Similarly, variations in distance between the scene and the 3D camera will require focal adjustments to assure fine resolution in the finished picture. For enhanced uniformity of the picture elements, a common focal adjustment (not shown) for all camera units is preferred.

Although the preferred disposition of the reels and the component elements forming camera units 11 is along a straight vertical plane orthogonally situated relative to the axis of the center camera unit of 3D camera 10, a slight arcual curvature is acceptable and can be compensated for by increasing the tolerances between the outside diameter of shaft 21 and both the internal diameter of hub 32 and the innermost extension of protrusion 36. Single film transport means also can be employed with arcually disposed camera units and reels by incorporating a slight degree of flexibility into shaft 21 thereby permitting the shaft to assume a generally arcual curvature. The flexibility of the shaft can be achieved by any of the conventionally known methods, e.g. by fabricating shaft 21 from flexibly joined straight linkages. When the single film transport means is composed of flexibly joined straight linkages, conventional film reels can serve as takeup spools 22 because of the curved configuration of the film transport means.

The operation of the common shutter drive to simultaneously activate the shutter blades of all camera units forming the 3D camera of this invention can be seen from FIG. 5. Shutter drive 40 is a straight elongated shaft situated at an orthogonal attitude with the optical axis of the center camera unit of 3D camera 10. The shutter drive extends across the front of camera units 11 below conventional normally closed shutter blades 42 and is pivotally connected along the length of the shutter drive to linkages 43 which directly control the operation of the shutter blades. A conventional shutter control mechanism, shown schematically and identified by reference numeral 41, is connected to one extremity of shutter drive 40 and is operable both to actuate the shutter drive thereby opening shutter blades 42 and to automatically release the shutter drive from the activated position after a fixed time interval to close the shutter blades. Although linkages 43 are disposed at a parallel attitude with the planes of shutter blades 42 and therefore assume an increasingly acute disposition relative to straight shutter drive 40 with increasing departure of the shutter blades from the center of 3D camera 10, the angular disposition between linkages 43 and shutter drive 40 is small for a 24 inch wide 3D camera and does not adversely affect the simultaneous operation of the shutter blades. A loose fitting pin 46 is employed to secure shutter drive 40 to linkages 43 which control the operation of the shutter blades.

When shutter drive 40 is moved laterally to the right by actuation of shutter control mechanism 41, lower shutter blades 44 and fixedly attached linkages 43 and 48, rotate unitarily in a counter-clockwise direction about pin 45. The rotary motion of linkages 48 is transmitted to upper shutter blades 47 through rotatable pinned linkages 49 and 51 in a conventional manner with linkage 49 moving axially and linkages 48 and 51 rotating counter-clockwise about pins 45 and 52, respectively. The rotary motion of linkage 51 rotates fixedly attached upper shutter blades 47 in a clockwise direction about pin 52.

The respective counter-clockwise rotation of lower shutter blades 44 about pin 45 and the clockwise rotation of upper shutter blades 47 about pin 52 open the normally closed shutter blades to simultaneously expose the frames of film 23 within film guides 19 of each camera unit. After a fixed exposure time as determined by an operational timer within shutter control mechanism 41, shutter drive 40 is released and spring biasing means (not shown) within the shutter control mechanism return the shutter blades to a closed position by a lateral movement of shutter drive 40 to the left. Because a common shutter drive is utilized to control the operation of all the optically convergent camera units forming the 3D camera of this invention, variations in the exposure of simultaneously photographed picture elements produced by divergent operational characteristics of individual shutter drives is eliminated.

While several examples of this invention have been shown and described, it will be apparent to those skilled in the art that many changes may be made without departing from this invention in its broader aspects; and therefore the appended claims are intended to cover all such changes and modifications as fall within the true spirit and scope of this invention.

What I claim as new and desire to secure by Letters Patent of the United States is:

1. A camera system for simultaneously photographing a given scene from diverse vantage points by a plurality of individual camera units having optical axes convergent upon the scene to be photographed, the improvement comprising a single film transport means in the form of a straight shaft operably associated with said plurality of camera units to simultaneously advance film frames within said camera units, and further including at least one film spool for each camera unit mounted upon said straight shaft, the axes of said film spools being pivotal relative to said straight shaft to assume a generally perpendicular attitude with the optical axis of the camera unit with which said spool is associated.

2. A camera system for simultaneously photographing a given scene from a plurality of diverse vantage points according to claim 1 including means for retaining film perpendicular to the optical axis of said individual camera units.

3. A camera system for simultaneously photographing a given scene from diverse vantage points according to claim 1 wherein each said spool is characterized by a cylindrical hub having circular flanges disposed at the ends of said hub at a perpendicular attitude relative to the hub axis, said film spools being pivotal relative to said straight shaft by inwardly extending pivotal means approximately centrally situated along the interior of said hub.

4. In a camera system for simultaneously photographing a given scene from diverse vantage points which system includes a plurality of camera units having optical axes convergent upon the scene to be photographed, each said camera unit further including normally closed shutter blades and means operably connected to said shutter blades to open said normally closed shutter blades upon activation of said means, the improvement comprising a single shutter drive rod fixedly connected to each said means along the length of said shutter drive rod to simultaneously open said shutter blades upon axial movement of said shutter drive rod.

5. A camera system for simultaneously photographing a given scene from diverse vantage points according to claim 4 wherein said means are unitary linkages, each linkage having opposite ends secured to said shutter blades and said shutter drive rod, respectively.

6. A camera system for simultaneously photographing a given scene from a plurality of diverse vantage points comprising a plurality of individual camera units having optical axes convergent upon the scene to be photographed, the lens components of said camera units being aligned in a straight plane with the planes of said lens components being disposed at a perpendicular attitude relative to an unrefracted light ray from the scene to be photographed, a single film transport means operably associated with said plurality of camera units to simultaneously advance film frames within said camera units, a film spool, said film spool having a cylindrical hub with circular flanges disposed at a radial attitude at the ends of said hub, means approximately centrally situated along the interior of said hub for pivotally mounting said spool upon said film transport means, normally closed shutter blades, linkage means operably connected to said shutter blades to open said normally closed shutter blades upon actuation of said linkage means, and a single shutter drive fixedly connected to each said linkage means along the length of said shutter drive to simultaneously open said shutter blades upon actuation of said shutter drive.

7. A camera system comprising a plurality of camera units, said camera units having optical axes convergent upon a given scene to be photographed, a film spool disposed along the optical axis of each camera unit, a single film transport means extending axially through and fixedly secured to each of said spools to simultaneously advance film frames within said camera units, normally closed shutter blades disposed along the optical axis of each camera unit and a single shutter drive fixedly connected to each of said shutter blades to simultaneously open said shutter blades upon actuation of said shutter drive.

References Cited

UNITED STATES PATENTS

| | | | |
|---|---|---|---|
| 1,347,103 | 7/1920 | Killman | 352—70 |
| 1,909,222 | 5/1933 | Pettie | 95—18 XR |
| 2,548,213 | 4/1951 | Gittins | 95—18 |
| 2,609,738 | 9/1952 | Staehlin | 95—18 |
| 3,251,284 | 5/1966 | Ratliff | 95—18 |
| 1,371,218 | 3/1921 | Bingham | 352—70 |

NORTON ANSHER, Primary Examiner

D. S. STALLARD, Assistant Examiner

U.S. Cl. X.R.

352—70